Nov. 18, 1947.   K. J. KOPPLIN   2,431,050
METHOD OF HEAT SEALING LAMINATED MATERIALS
Filed July 12, 1943   3 Sheets-Sheet 3
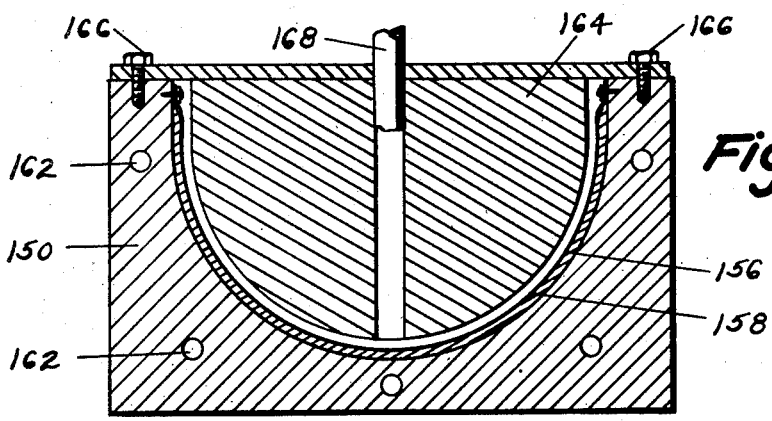
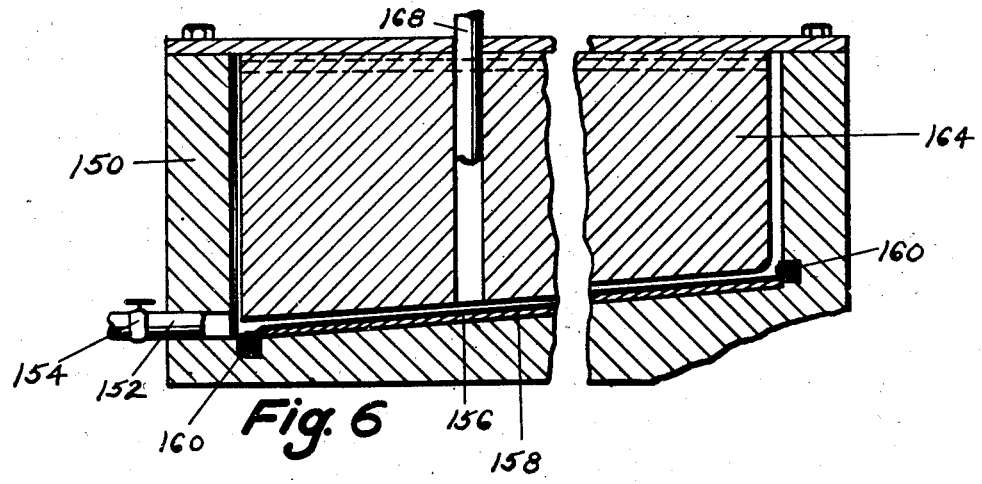
INVENTOR.
BY  Karl J. Kopplin
Roy M. Eilers Patented Nov. 18, 1947

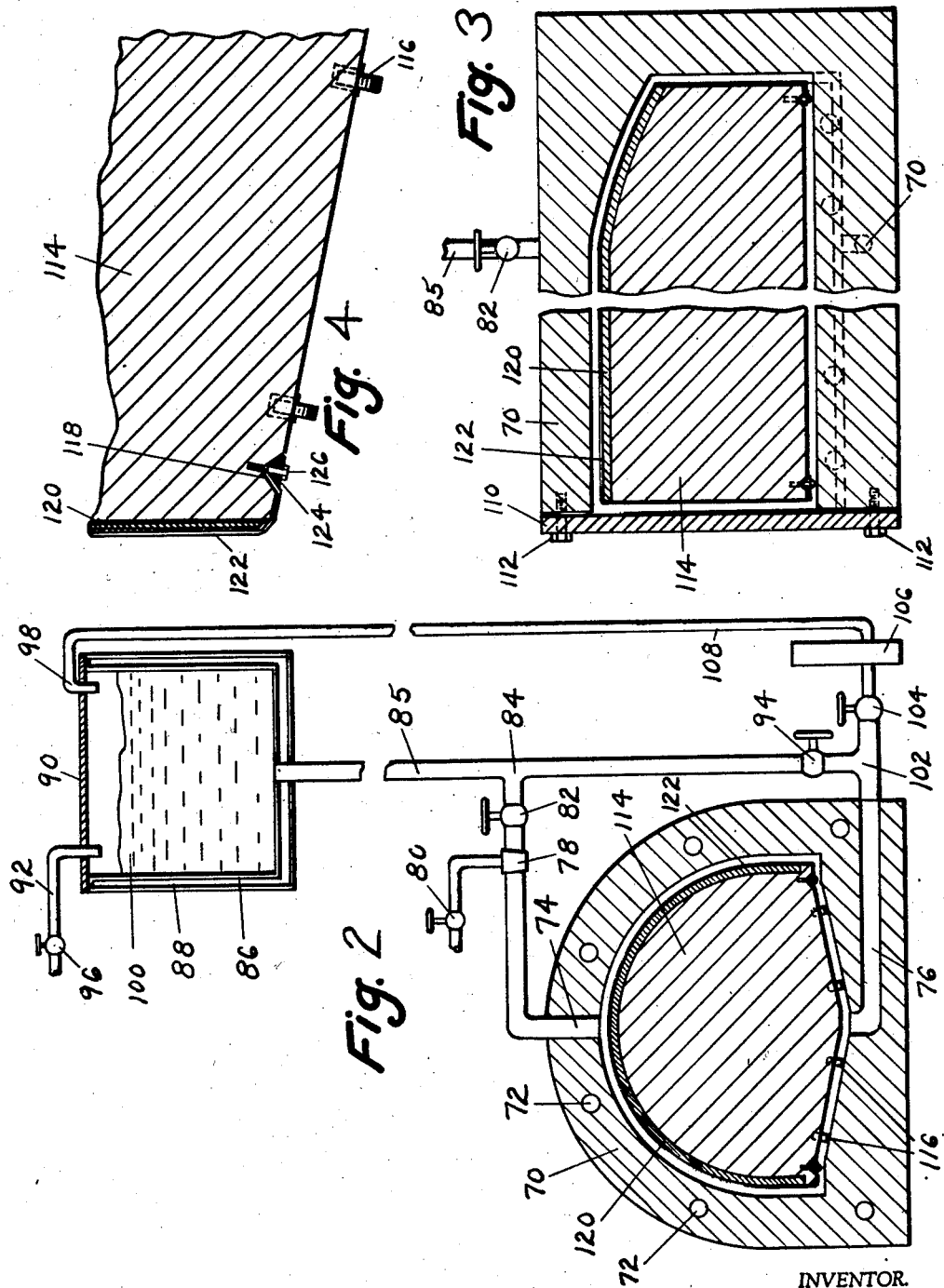

2,431,050

UNITED STATES PATENT OFFICE 2,431,050

METHOD OF HEAT SEALING LAMINATED MATERIALS

Karl J. Kopplin, St. Louis County, Mo.

Application July 12, 1943, Serial No. 494,423

8 Claims. (Cl. 154—110)

This invention relates to improvements in laminated materials. More particularly the invention relates to improvements in methods of making laminated materials that comprise the bonding of lamina under heat and pressure.

It is therefore an object of the present invention to provide a method of making laminated materials that are bonded together by heat and pressure.

Many laminated materials are being bonded together today under heat and pressure. These materials include plywoods, plies of paper, plies of cloth and other materials. Where the laminated material is flat, the plies are coated or impregnated with a suitable material and are then placed under a platten and subjected to great heat and pressure. This method is not nearly as satisfactory as it should be. For instance the pressure is usually applied rather quickly and is released almost as fast. This means that the pressure is often released rather rapidly while the material is quite hot. As a result, the very heavy pressure on the volatiles, from the material constituting the bonding substance, is released suddenly and the volatiles tend to expand. This expansion may affect the value of the finished product considerably and it is therefore much more desirable to release the pressure gradually, thus permitting a gradual equalization of the pressures in the laminated material. It is therefore an object of the present invention to provide a method of gradually increasing the pressure on laminated materials and then gradually decreasing that pressure to permit gradual equalization of pressure in that material.

Many laminated materials are made in sections today by placing a plurality of sections of lamina on top of each other in a platten. The sections are then subjected to heat and pressure and are thereby bonded together. Such sections of course can subsequently be secured together to form a continuous sheet, but such a sheet is not as satisfactory as a completely integral sheet of bonded material. Furthermore the manufacture of laminated material in sections by the use of plattens requires periodic increases in the temperature and pressure of the plattens. These periodic increases in temperature take time and tend to prevent a continuous manufacturing of the laminated materials. Since continuous operations decrease the costs of production, they are much more desirable than periodic operations. The present invention makes continuous laminating operations possible, and it is therefore an object of the present invention to provide a continuous manufacture of laminated materials by application of heat and pressure.

The pressures used today in bonding laminates are dynamic and must be supplied by heating a volatile liquid such as water or by use of pumps. Such methods are not as desirable as hydrostatic methods of providing pressure because they require tight seals and use more heat. The present invention makes possible the use of hydrostatic pressures in molding and it is therefore an object of the present invention to mold laminates by use of hydrostatic pressures.

Present day methods of making laminated materials are not limited to the making of flat sheets of laminated material but can be used to form various shapes and contours. In these methods, laminae are placed on a form and are then covered by a rubber bag. Air is exhausted from the bag and steam is forced against the rubber bag. The rubber bag is relatively thin and flexible and will quickly transfer the heat and pressure from the steam to the laminates. This method is not as desirable as it might be because very high pressures are encountered. Accordingly it becomes quite difficult to hold this steam. In addition the hotter the steam the shorter the life of the rubber bag. Furthermore, the bag retards the escape of volatiles from the laminae. The present invention provides fluid metal as the heat and pressure medium in molding. Such a medium can be heated to a great degree without tending to volatilize. This reduces the pressure and leakage problems encountered with steam. Furthermore, the fluid metal has better heat transferring properties than steam. It is therefore an object of the present invention to provide fluid metal as the heat and pressure medium in molding laminated materials.

One kind of fluid metal that can be used is mercury, or quick silver, and another kind is the group of low melting point alloys that have melting points below temperatures at which paper, cloth or wood chars. Such low melting point alloys are particularly desirable because their tendency to solidify at normal temperatures retards any leakage from molds. For instance, if the metal tended to flow through a gland in the equipment, it would get cooler as it approached the exterior of the equipment and would tend to solidify and prevent leakage of the rest of the metal. Such metals are also useful because they reach a plastic stage before they melt. While in this plastic stage, they could be used to exert a hydrostatic pressure on the laminates although they would not tend to flow. It is therefore an object of the present invention to use low melting alloys as heat and pressure mediums in the bonding of laminated materials.

Other objects and advantages of the invention will become apparent from an examination of the drawing and accompanying description.

In the drawing

Fig. 2 is a partial cross sectional end view of a bonding operation using hydrostatic pressure, Fig. 3 is a cross sectional side view of the autoclave shown in Fig. 2, Fig. 4 is a cross sectional view of a part of the form shown in Figs. 2 and 3, Fig. 5 is a cross sectional end view of a molding operation, and Fig. 6 is a cross sectional side view of the operation shown in Fig. 6.

Figure 1:
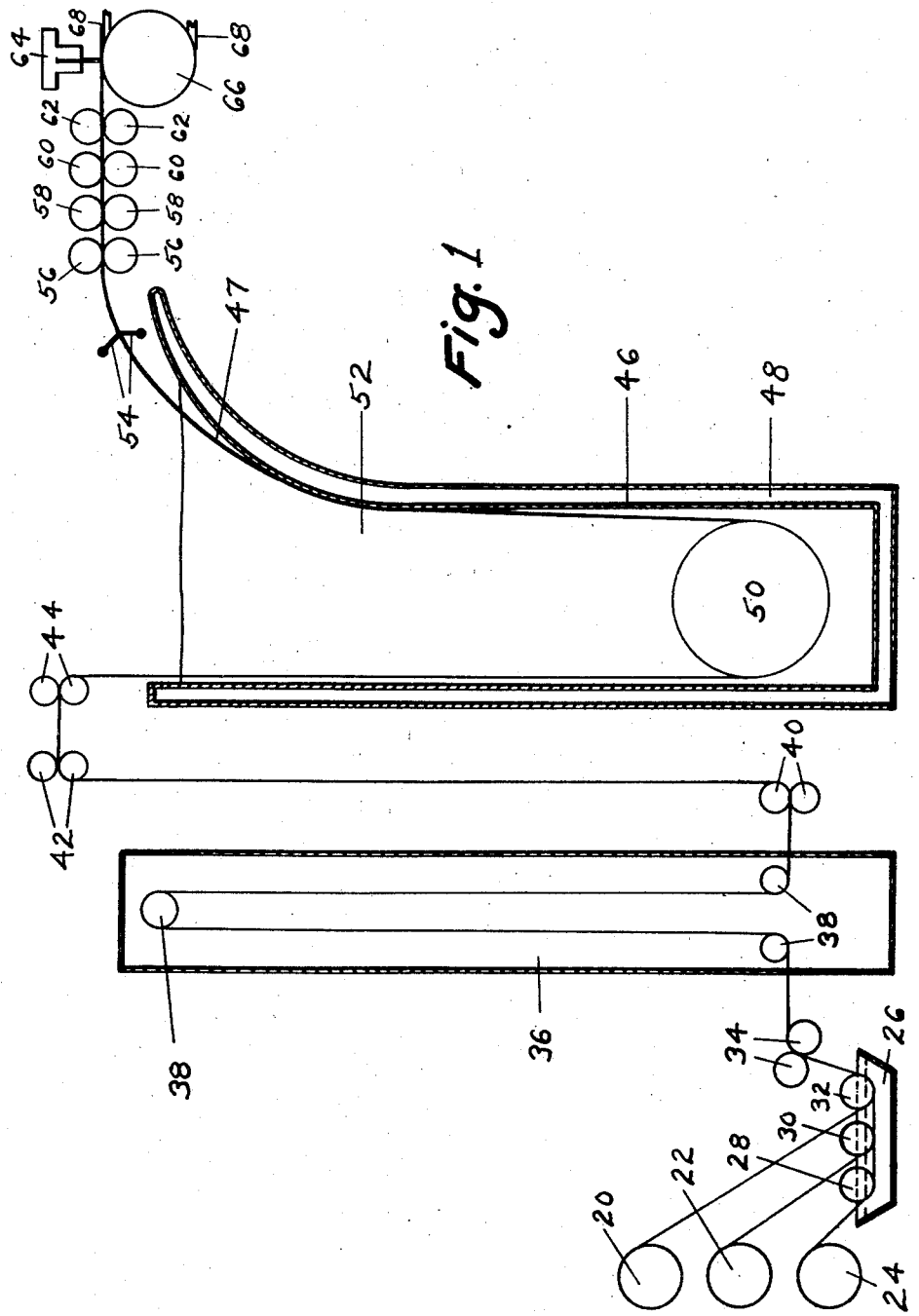
Fig. 1 is a schematic view of a continuous laminating operation.

Referring to the drawing in detail, a plurality of rolls of paper are denoted by numerals 20, 22 and 24. These rolls of paper may be of any suitable construction but are preferably mounted so they can rotate on suitable centers of rotation. The ends of the paper that form rolls 22 through 24 are led down into container 26 that contains a suitable binder solution. This binder preferably is a binder that is affected by heat. Positioned in proximity to container 26 and arranged so their lower portions rotate in said solution are rollers 28, 30 and 32. The paper from roller 20 is fed under roller 32 and impregnated with the binder where it comes into contact with the paper from roll 22. The paper from roll 24 is fed under roller 28 where it is impregnated with the binder, passes under roller 30 and roller 32 where it contacts the paper from roll 22. The rolls 20 through 24 are preferably equipped with suitable rotation retarding devices that will keep the paper taut as it moves down into the container 26 and bends around the rollers 28, 30 and 32. The rollers 28 through 32 can have power applied to them to cause them to rotate and help feed the paper from rolls 20 through 24, or they can be idlers. As the impregnated sheets of paper come out of container 26 they pass through cooperating rollers 34. These rollers are pressed into engagement with each other by suitable means such as springs, gravity or air pressure. The rollers 34 may be powered to cause the paper to roll off of rolls 20 through 24, or they may be idlers. The rolls 34 serve a dual purpose if they are idlers, namely: to press the sheets of paper into intimate engagement with each other and thereby press out any air bubbles, and also to serve as means to remove excess binder solution. If the rolls are power driven, they serve a treble purpose, namely: to draw the paper from rolls 20 through 24, to press the sheets of paper into intimate engagement with each other and to remove excess binder solution.

The impregnated sheets of paper are led into a vertical drying chamber 36 that may be heated by suitable means, not shown, to evaporate the excess volatiles in the binder solution picked up by the paper. One such means would be hot air, and such a means works very well in drying the paper. Rollers 38 are provided in drier 36 to keep the paper in proper arrangement and to obviate sharp turns around which the paper must bend. The larger the rollers 38 the better, because a large roller means less "crawling" of the paper as it is bent around the roller. "Crawling" is experienced where plies of paper are bent around small rollers because the bending radii of the respective plies are appreciably different. With larger rollers, the percentage of difference in the bending radii is smaller, and "crawling" is less pronounced. After the paper has been dried, it leaves drying chamber 36 and passes through rollers 40 which permit it to bend and move upwardly. The paper then passes through rollers 42 and 44. Rollers 40, 42 and 44 can be pressure rollers, or can be rollers that serve to change the direction of movement of the paper.

Where desired, rollers 42 or 44 can be arranged to roll a tape over the edges of the laminates of paper. Such a tape could be of any suitable type, and the transparent tape known as Scotch tape would do very well. This tape would seal the edges of the paper together so the sheets of paper and tape would constitute a completely sealed envelope.

Positioned below rollers 44 is a large container 46 that is surrounded by a jacket containing a heat transferring medium. This heat transferring medium may be hot air, hot gases, steam, fluid metals such as mercury or low melting point alloys and the medium will be heated by suitable heating means, not shown. Positioned in container 46 is a large roller 50 that has a very appreciable diameter. Also positioned in container 46 is a fluid metal 52 that may be mercury or a low melting point alloy. This fluid metal will be heated by heat transferred through the walls of container 46 from heat medium in the jacket 48. Where a low melting point alloy is used the temperature of the alloy in container 46 must be higher than the melting point of the alloy. A suitable drain, not shown, may be provided for container 46 in the event it is desired to empty that container. The container 46 is preferably of considerable depth so it will have a large "head" of metal. This "head" of metal will exert pressure on the sheets of paper passing through the container and the deeper the container the greater the pressure exerted at the bottom of the container. The container may be of any suitable design but the side of the container past which the paper moves in leaving the container should preferably be formed as shown in the drawing. Such a formation permits a gradual bending rather than a sharp bending of the paper. If desired, a number of small rolls could be provided along the arcuate surface of container 46 to permit the paper to roll as it leaves the container. The arcuate portion 47 is not absolutely needed, but it is desirable to prevent sharp bending of the paper after it has been heated in container 46. Where an arcuate portion is not provided, the paper should be passed over a series of large rolls or a series of smaller rolls formed in a large arc.

Positioned above arcuate portion 47 are wipers 54 that are preferably held together under pressure. These wipers, as their names indicate, remove any fluid metal that might tend to be carried out of the container on the paper. Any such metal would be forced to drain back into the container. After passing through wipers 54, the paper is passed through pairs of rolls 56 through 62. These rolls may be heated or cooled as desired and may be forced together under pressure. These rolls may be calendering rolls and may provide a sheen on the paper. After the paper passes through rolls 56 through 62, it may be cut off by a cutting device 64. This cutting device preferably is set at an angle to the paper so it can make a perpendicular cut in the paper as the paper continues to roll over roller 66. If it is not desired, to set the cutting device 64 at an angle, it can be set perpendicular to the paper and the paper stopped during the cutting operation. However, stopping of the paper is not desired because it would provide unequal heating and pressing of the portions of the paper, and it is more desirable to keep the paper moving through the container at a uniform rate of speed. After the paper is cut off, it will be carried on conveyor 68 which is supported at one end on roller 66. If desired, the paper need not be cut off, but can be rolled onto suitable rolls.

With this construction, one or more sheets of paper can be impregnated with a binder by passing it through a container filled with a solution of that binder. The sheets of paper are then brought together and squeezed into engagement with each other. While in this intimate engagement they are passed through a drying chamber where they are dehydrated. The dehydrated sheets of paper can then be provided with tape to seal their edges and can then be introduced into the container filled with heated fluid metal. If the binder is tacky and possesses considerable adhesiveness, the tape may be dispensed with because the rolls through which the paper passes can effectively seal the edges of the paper. In either case, the edges of the sheets of paper are sealed before the paper is fed into the container that is filled with heated fluid metal. As the sheets of paper move down into the metal, they will be heated and will also be pressed firmly together. The farther down into the metal the sheets of paper go, the greater will be the pressure that is exerted to force the sheets of paper together. Depending on the depth of the container and the weight of the metal, the pressure can be made almost any value. Because metals such as mercury are quite heavy, a high pressure can be obtained in a container of fair size. The pressure applied to the sheets of paper will gradually increase until the sheets of paper reach the bottom where the pressure is at its maximum value. After the sheets of paper start up again they will be subjected to a gradual decrease in pressure that is very desirable because it permits a gradual equalization of the pressures in the laminates. This is particularly desirable where the binder yields volatiles when it is heated. The fact that the paper is surrounded by a liquid pressure medium and is subjected to a gradually increasing and then a gradually decreasing pressure freely permits the volatiles to escape and further permits the internal pressures to equalize. It will be noted that the bending to which the paper is subjected before it enters container 46 is much greater than the bending after the paper has entered container 46. This is due to the fact that the passage of the paper through container 46 tends to make the sheets of paper bond to each other. This bonding is a stiffening action and as a result the paper should not be bent as much as it was before it was bonded. That is why roller 50 has such an appreciable diameter and is also why container 46 is provided with arcuate portion 47.

Container 46 may be made of any suitable material but is preferably made of metal although it can be made of concrete or other non-metallic materials. A metal container gives a very satisfactory heat transfer between the heating medium in jacket 48 and the metal 52. The container 46 is preferably made of iron or steel because that metal does not alloy readily with mercury or with low melting point alloys.

The melting temperature of the alloy can be determined by changing the proportion of its constituent elements and can be set at any desired figure. Preferably the temperature is set above the flow temperature of the binder used to bond the sheets of paper together.

The use of a container of heated fluid metal to provide pressure for plies of paper permits the provision of continuous bonding of paper. It makes this possible by eliminating any pressure seals because the paper enters and leaves the container at atmospheric pressure and the hydrostatic pressure of the fluid metal itself provides the bonding pressure. As a result of the use of this invention it is possible to make plies of any desired length because the paper from the rolls 20 through 24 can be made substantially continuous by attaching the tail end of the rolls 20 through 24 to the leading edge of the rolls inserted in their places.

The invention is not limited to three plies of paper as shown, but can be used for any number of plies merely by adding additional rolls of paper and increasing the size of container 26. Furthermore the invention is not limited to paper alone but can be used with plies of wood, fabric or any other substance that can be made to form continuous plies that are flexible enough to be bent around rollers.

In the bonding operation illustrated in Fig. 1, the plies of paper are impregnated with a binder solution. In many cases the plies need not be impregnated with binder but they can be coated instead. The coating operation can be performed quite easily by wiping the surfaces of the plies with binder solution instead of immersing the plies completely, and it could be done quite easily by devices known to those skilled in the art. The coating of plies is particularly desirable where the plies are of wood or fabric. Such plies inherently possess considerable strength and it is not necessary to use as much binder as is needed with some plies that are made of paper. However, whether the plies are impregnated or are merely coated with a binder, they may be said to be treated with binder solution.

In the description of the operation illustrated in Fig. 1, the desirability of sealing the edges of the plies was pointed out. Furthermore, it was pointed out that the sealing could sometimes be accomplished merely by rolling the edges of the plies, where the binder was tacky. In other cases a tape was provided that would overlie and seal the edges of the plies. Still another sealing means can be used, and that is metal sprayed onto the edges of the plies after the plies had been brought into engagement with each other. The metal is preferably the same alloy that is used in container 46. This alloy will temporarily seal the edges of the plies until the plies have passed into the fluid metal 52 for an appreciable distance. By that time the plies will have been pressed tightly together so no fluid metal can get between the plies and it will be all right for the sprayed metal to melt and run off. Such an arrangement obviates the need of stripping off of the tape, that should be done where a tape is used to seal the edges of the plies.

In Figs. 2, 3 and 4 equipment is shown that can be used to form laminated materials with desired curvatures. An auto-clave is denoted by the numeral 70 and is provided with heating ducts 72 in the walls thereof. The auto-clave 70 may be made of any suitable material but is most easily made from a cast material such as concrete. Autoclave 70 is also provided with a pipe 74 to permit the introduction of heated fluid metal into the autoclave and a pipe 76 to permit the removal of heated fluid metal from the autoclave. Pipe 76 communicates with the lowermost part of auto-clave 70 so the metal will readily drain into pipe 76. Pipe 74 is connected to T-junction 78 that is connected to valves 80 and 82. Valve 82 is connected to T-junction 84 which communicates with container 86 through pipe 85 and also communicates with valve 94. Container 86 is provided with a jacket 88 containing a heating medium such as hot air, heated gases, steam, heated fluid metal or any other suitable heating medium. Container 86 is provided with a cover 90 through which high pressure air line 92 projects. High pressure air line 92 is provided with a valve 96 that regulates the flow of high pressure air into container 86. Container 86 is also provided with return line 98 for fluid metal. Positioned within container 86 is a supply of fluid metal 100 that is heated by the heat transferring medium in jacket 88. Valve 94 is connected to T-junction 102 that is connected to pipe 76 and to valve 104. Valve 104 is connected to pump 106 that forces fluid metal upwardly through pipe 108 into nozzle 98 where it empties into container 86.

The autoclave 70 is provided with a closure member 110 that is shown secured to the autoclave by bolts 112. In actual practice the closure member 110 will be secured to autoclave 70 by a means that can be operated more quickly than bolts 112 could be seated, but the bolts 112 are adequate to illustrate the invention. Removably positioned in autoclave 70 is a form 114 that is made of a suitable material substantially unaffected by heat. This form 114 is provided with a plurality of rollers 116 that support the form and permit it to be rolled into and out of the autoclave. The form 114 is also provided with a plurality of triangular recesses 118 that extend around the perimeter of the bottom of the mold. Positioned on the upper surfaces of form 114 are a plurality of plies 120 of paper, cloth or wood, that have been treated with a suitable binder. Placed over the plies 120 is a cover of durable material that is substantially inextensible and non-resilient. One such material is canvas but any suitable material may be used. This material must be woven closely enough so it is impervious to heated fluid metal although it is pervious to air. In the case of low melting temperature alloys the material can be rough woven because the viscosity of the low melting point alloys can be made quite high by adding material such as sulphur. Where however, it is not desired or is not possible to increase the viscosity of the fluid metal, the pores of the cloth can be treated with a suitable material that will make the material fairly resistant to the fluid metal. For instance it would be possible to treat the pores of the material with a thermoplastic resin having a flow temperature above the temperatures used in autoclave 70. Such a resin is quite desirable because it will keep the cover from absorbing some of the binder on the plies and being affected by said binder. Furthermore, such a resin would soften when heated and permit the evolution of gases from the plies.

The ends of the cover member 122 are laid in the triangular recesses 118 and are securely held there by triangular members 124 that are held in place by screws 126. In actual practice screws 126 may not be used, and instead some quick clamping means may be provided; but screws 126 adequately illustrate the principles of the invention.

The operation of this structure is quite simple. Plies of wood cloth, paper or other material are treated with a binder. These treated plies are then formed around form 114 and the cover 120 is placed over the plies. The ends of the cover are placed in triangular recesses 118 and are securely held there by triangular members 124. The closure member 110 is then removed from autoclave 70 and form 114 is rolled into the autoclave. Thereupon the closure member is replaced and securely held in place. Valves 80, 96 and 104 will be left closed and valves 82 and 94 will be opened. The purpose of valve 80 is to facilitate the draining of the autoclave at the conclusion of the bonding operation, as explained more fully hereinafter. In the drawing, these valves are shown as manually operable valves but they can be operated electrically or by any other automatic means known to those skilled in the art. When valves 82 and 94 are opened, heated fluid metal 100 will flow into autoclave 70 through pipes 74 and 76. Where the pipe 85 is long enough, the weight of the metal alone will provide sufficient pressure. Where however the length of pipe 85 is not adequate, or where excessively high pressures are to be used, the valve 96 may be opened to admit compressed air or other fluid under pressure into container 86. This compressed air will increase the pressure exerted on the plies 120 on form 114. The temperature of plies 120 will be raised by the heat from liquid metal 100 and the pressure coupled with the heat will bond the plies together.

Once the plies have been bonded, valves 82, 94 and 96 are closed and valves 80 and 104 are opened. Valve 96 should be a leach valve so air can be dissipated from container 86 when valve 96 is closed. When valves 80 and 104 have been opened, the pump 106 can be actuated. This pump preferably is of the plunger type because that type gives positive action. Valve 80 is connected to a source of compressed air and will cooperate with pump 106 to drain autoclave 70. Where exceptionally rapid draining of autoclave 70 is desired, a large sump, not shown, may be provided that is normally empty and the fluid metal can drain into it after the bonding operation is completed. Such a sump would be shut off from line 76 during the bonding operation and could be emptied by pump 106.

When the autoclave has been emptied of fluid metal the closure member 110 can be removed and form 114 rolled out. For rapid operation, a number of forms 114 should be provided so the autoclave need not be idle while the plies are being laid on forms 114. If enough forms were provided the autoclave 70 could be operated continuously on one form after another. The provision of a number of forms is also desirable because it would make possible heat treating of the plies after removal from the auto clave but before they were removed from the forms 114.

One very pronounced advantage obtained by using low melting point alloys as the heat and pressure medium is found in the fact that those alloys solidify at room temperature. This fact makes it possible to hold those alloys under very considerable pressures. For example if the metal tended to leak out through the joint between closure member 110 and the end of autoclave 70, the metal would solidify when it got close to the outer edge of the autoclave because it would reach a temperature below its melting point.

This metal then would become an additional sealing agent and would tightly seal the autoclave against leakage.

In Figs. 5 and 6, a form of autoclave is shown that is somewhat different from, but has the same operation as, the autoclave shown in Figs. 2 and 3. This autoclave is denoted by the numeral 150 and it is provided with a pipe 152 that is similar to pipe 76 of autoclave 70.

Pipe 152 is provided with a valve 154 that is connected to a pressure system, not shown, that may be similar to the pressure system shown in Fig. 2. Plies 156 of paper, cloth or wood are laid up in the autoclave and are covered by a cover 158 that is similar to cover 122. The ends of cover 158 are held down by nails or screws 160. Nails or screws 160 are seated in strips of wood or similar material secured to the walls of autoclave 150. Also positioned in the walls of autoclave are heating ducts 162.

A closure member and spacer 164 is provided and is secured to autoclave 150 by bolts 166. Closure member and spacer 164 is provided with a pipe 168 that functions in the same way as pipe 74 functions in Fig. 2. Pipe 168 must be connected to a pressure system of the type disclosed in Fig. 2 by a removable joint or by a flexible connection, whichever is desired.

The operation of the autoclave in Figs. 5 and 6 is quite similar to the operation of the autoclave shown in Figs. 2 and 3 and differs only in forcing the plies outwardly instead of inwardly. This is not a fundamental difference but is merely one of design or preference.

One of the advantages of the present invention is that it uses a heat and pressure medium which is substantially non-compressible and non-volatile during the temperature ranges involved in the bonding of laminated materials. Such material not only has a high heat transferring ability but it is fluid and can apply hydrostatic pressure. A further advantage of using low melting alloys is that they can be made to have a high viscosity. With such alloys the plies themselves, or the cover provided for them, can be pervious to air and hot gases but impervious to the heat and pressure medium. As a result it is possible to use a cheap fabric to separate the heat and pressure medium from the elements to be bonded, and to permit continual evolution of volatiles and gases from the elements. Still another and very important advantage of the present invention resides in the fact that it obviates the time and extremely intricate work required to fit a male and female die together. With the present invention, only the male or the female member is needed since the fluid metal can immediately assume the configuration of the die member and can serve as its complement.

In the drawing the autoclaves have been illustrated as they are used to bond bent surfaces, but they can be used as well to bond plane surfaces. This can be done by placing a series of sheets on suitable racks in the autoclave, sealing the edges of the sheets and introducing the heated fluid metal into the autoclave. When used in this manner, the autoclave operates similarly to the container 46 of Fig. 1.

Whereas a number of preferred embodiments of the invention have been shown and described it is obvious to those skilled in the art that various changes may be made in the form of the invention without affecting the scope of the invention.

What I claim is:

1. A method of making a laminated product which comprises treating a plurality of elements with a binder, positioning said plurality of elements in engagement with each other, spray coating a portion or all of the exposed surfaces of said elements with a molten hardenable metallic membrane to maintain a hydrostatic pressure on said exposed surfaces when said positioned plurality of elements has a fluid pressure material applied thereto, and applying pressure to the exposed surface of said plurality of elements with a weight of fluid pressure material that is adequate to bond said plurality of elements together, said fluid pressure material being substantially non-volatile and being substantially non-compressible at temperatures required to melt said hardenable metallic film.

2. A method of making a laminated product by assembling binder treated plies over a supporting surface, coating said assembly with a metallic membrane and applying fluid pressure, said membrane having a melting point lower than the temperature of the fluid material used in bonding said plies by application of hydrostatic pressure.

3. A method of making a laminated product by sealing laminae against the influx of extraneous material during treatment which consists of coating a portion of the laminae with a film of low melting point metallic alloy to exclude a heated fluid pressure medium, until said laminae are bound together by the action of heat and pressure thereon, and applying a heated fluid pressure medium to the laminae, said fluid pressure medium being substantially non-volatile during the range of temperature employed in making said laminated product.

4. A method of making a laminated product by sealing laminae against the influx of extraneous material during treatment, which consists of coating a portion of the laminae with a film of metallic alloy to exclude a heated metallic fluid pressure medium, said metallic film having a melting point sufficiently low as to result in melting said film during the application of said heated fluid pressure medium and applying said heated fluid pressure medium to said laminae.

5. A method of making a laminated product by sealing laminae against the influx of extraneous material during treatment, which consists of coating a portion of the laminae with a film of metallic alloy having approximately the same melting point as the metallic alloy utilized as a heat and fluid pressure transmission means, and applying said metallic alloy to said laminae to provide heat and pressure sufficient to bond said laminae together.

6. A method of making a laminated product which comprises the positioning of a plurality of elements in engagement with each other, spray or dip-coating said positioned elements with a molten hardenable metallic film to keep a fluid pressure medium from flowing between plies when pressure is applied, and applying pressure by allowing the weight of a head of fluid pressure material to hydrostatically press against said positioned plurality of elements, said fluid pressure material being capable of being heated to a temperature at least as great as the melting point of said hardenable metallic film.

7. The method of making a laminated product that comprises placing a plurality of binder-treated elements adjacent each other, bringing the edges of said elements into intimate engagement, sealing the edges of said elements with normally solid, heat-softenable material to provide a fluid-impervious envelope, and applying a heated fluid to said envelope to press the said elements into intimate relation and to cause the binder to bond said elements together, said heated fluid being heated sufficiently to soften said normally solid sealing material and thereby facilitate the removal of said material from said elements.

8. The method of making a laminated product that comprises placing a plurality of binder-treated elements adjacent each other, bringing the edges of said elements together into intimate engagement, temporarily sealing the edges of said elements with material which is resistant to heated fluid metal so fluid metal cannot pass between said elements, said material being removable from said elements after said elements have been bonded together, applying a heated fluid metal to the exposed sides and the sealed edges of said elements to press the elements together and to heat the binder and cause it to bond the elements together, and separating the fluid metal from the bonded elements and separating the sealing material from said elements.

KARL J. KOPPLIN.

REFERENCES CITED

The following references are of record in the file of this patent:

UNITED STATES PATENTS

| Number | Name | Date |
| --- | --- | --- |
| 1,377,517 | Novotny | May 10, 1921 |
| 1,475,623 | Egerton | Nov. 27, 1923 |
| 1,610,910 | Williams | Dec. 14, 1926 |
| 1,656,874 | Snyder | Jan. 17, 1928 |
| 1,793,054 | Carns | Feb. 17, 1931 |
| 2,333,143 | Bennett | Nov. 2, 1943 |
| 1,370,666 | Novotny | Mar. 8, 1921 |
| 1,211,487 | Price | Jan. 9, 1917 |
| 1,343,191 | Allcutt | June 15, 1920 |
| 2,202,042 | Blount | May 28, 1940 |
| 1,589,841 | Daly | June 22, 1926 |
| 1,845,133 | Davis | Feb. 16, 1932 |
| 1,880,785 | Card | Oct. 4, 1932 |
| 1,243,654 | Clark | Oct. 16, 1917 |

FOREIGN PATENTS

| Number | Country | Date |
| --- | --- | --- |
| 480,880 | Great Britain | Mar. 2, 1938 |
| 401,276 | Great Britain | Nov. 6, 1933 |